United States Patent
Akimatsu

(10) Patent No.: US 9,764,916 B2
(45) Date of Patent: Sep. 19, 2017

(54) SHEET CONVEYING DEVICE AND IMAGE READING DEVICE

(71) Applicant: Brother Kogyo Kabushiki Kaisha, Nagoya-shi, Aichi-ken (JP)

(72) Inventor: Takayuki Akimatsu, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/010,434

(22) Filed: Jan. 29, 2016

(65) Prior Publication Data

US 2016/0221776 A1   Aug. 4, 2016

(30) Foreign Application Priority Data

Jan. 29, 2015  (JP) ................. 2015-015891

(51) Int. Cl.
*B65H 5/38* (2006.01)
*B65H 3/06* (2006.01)
(Continued)

(52) U.S. Cl.
CPC .............. *B65H 5/38* (2013.01); *B65H 3/0684* (2013.01); *B65H 5/062* (2013.01); *G03G 15/602* (2013.01); *H04N 1/00* (2013.01); *B65H 2401/115* (2013.01); *B65H 2402/441* (2013.01); *B65H 2402/80* (2013.01); *B65H 2404/144* (2013.01); *B65H 2404/513* (2013.01);
(Continued)

(58) Field of Classification Search
CPC .......... B65H 2402/441; B65H 2404/61; B65H 2404/5211; B65H 2404/5214; B65H 2404/50; B65H 3/0684; B65H 5/38; B65H 2401/115
See application file for complete search history.

(56) References Cited

U.S. PATENT DOCUMENTS 8,109,498 B2 * 2/2012 Akimatsu ............ B65H 3/0684
271/10.01
8,322,714 B2 * 12/2012 Satomi ..................... B65H 5/38
271/264
(Continued)

FOREIGN PATENT DOCUMENTS

JP    2010280505 A  * 12/2010 .......... B65H 3/0684
JP    2012-236707 A    12/2012
(Continued)

*Primary Examiner* — Patrick Cicchino
(74) *Attorney, Agent, or Firm* — Banner & Witcoff, Ltd.

(57) ABSTRACT

A sheet conveying device includes a conveying unit configured to convey sheets along a predetermined conveyance path, and a cover member disposed at a position covering the conveying unit and constituting one of exterior surfaces of the sheet conveying device. The cover member includes a first base portion constituting one of the exterior surfaces, a second base portion facing the first base portion across a space, and a plurality of linking portions provided between the first base portion and the second base portion and linking to both the first base portion and the second base portion. The first base portion, the second base portion, and the plurality of linking portions are integrally formed of a resin material into one piece. The second base portion includes a plurality of ribs protruding from a surface of the second base portion opposite to the first base portion.

13 Claims, 9 Drawing Sheets

(51) Int. Cl.
*B65H 5/06* (2006.01)
*G03G 15/00* (2006.01)
*H04N 1/00* (2006.01)

(52) U.S. Cl.
CPC .. *B65H 2404/6111* (2013.01); *B65H 2801/06* (2013.01); *B65H 2801/39* (2013.01)

(56) References Cited

U.S. PATENT DOCUMENTS

| | | | | |
|---|---|---|---|---|
| 8,348,418 | B2 * | 1/2013 | Uchino | B65H 5/062 |
| | | | | 347/104 |
| 8,382,095 | B2 * | 2/2013 | Osanai | B65H 1/04 |
| | | | | 271/117 |
| 8,720,888 | B2 * | 5/2014 | Masuda | G03G 15/234 |
| | | | | 271/186 |
| 8,991,822 | B2 * | 3/2015 | Kozaki | B65H 29/52 |
| | | | | 271/273 |
| 9,242,819 | B2 * | 1/2016 | Takezawa | B65H 3/0669 |
| 9,296,578 | B2 * | 3/2016 | Ohta | B65H 1/04 |
| 2008/0303204 | A1 * | 12/2008 | Lee | B65H 3/0684 |
| | | | | 271/121 |
| 2016/0255211 | A1 * | 9/2016 | Kawabata | H04N 1/0032 |
| | | | | 358/1.14 |

FOREIGN PATENT DOCUMENTS

| | | | | |
|---|---|---|---|---|
| JP | 2014118243 A | * | 6/2014 | ............ B65H 5/062 |
| JP | 2014118244 A | * | 6/2014 | ............ B65H 7/02 |

* cited by examiner

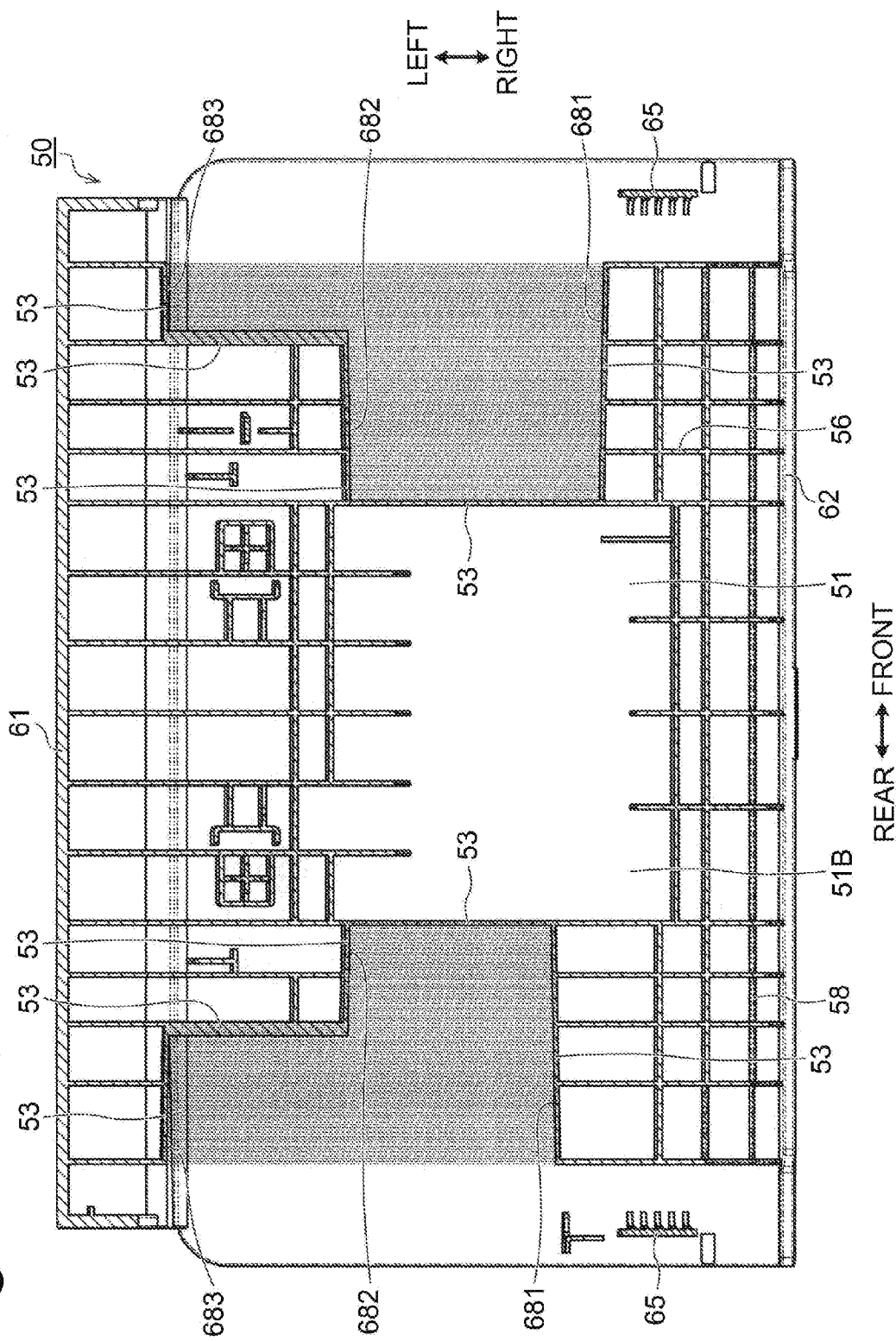

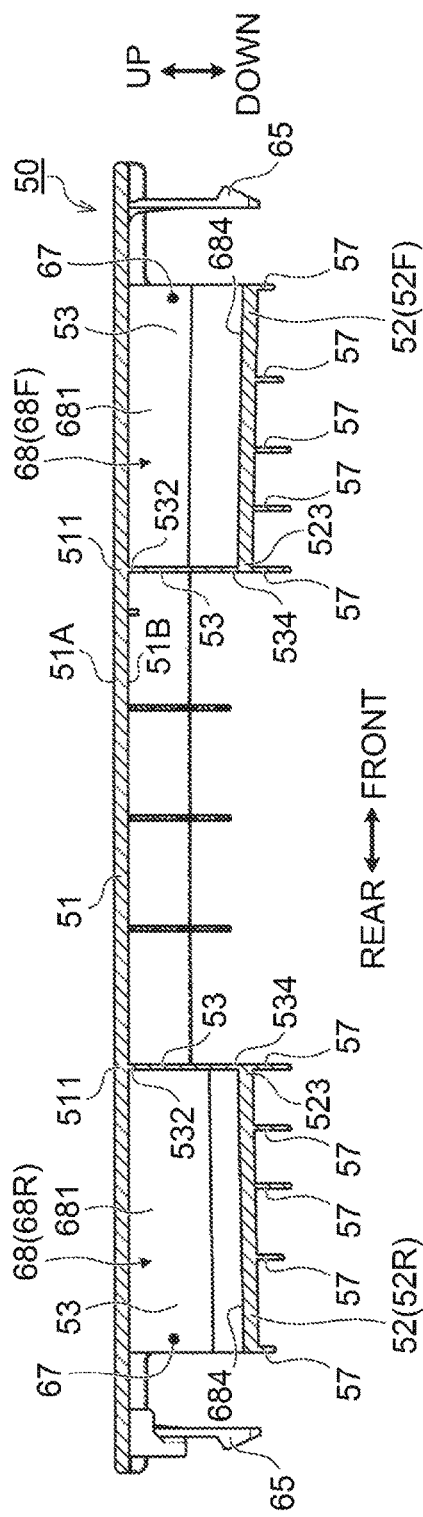
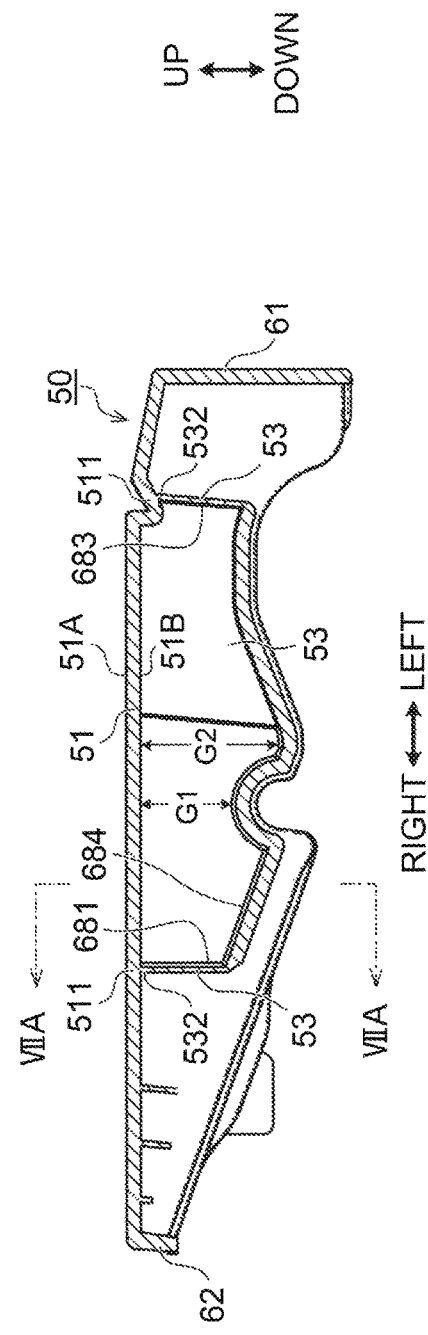
Fig.7A
Fig.7B

SHEET CONVEYING DEVICE AND IMAGE READING DEVICE

CROSS-REFERENCE TO RELATED APPLICATION

This application claims priority from Japanese Patent Application No. 2015-015891, filed on Jan. 29, 2015, which is incorporated herein by reference in its entirety.

TECHNICAL FIELD

Aspects described herein relate to a sheet conveying device and an image reading device.

BACKGROUND

A known image reading device includes an automatic document feeder (ADF) which has a cover member that covers components such as rollers. The cover member has an outer surface constituting one of exterior surfaces of the image reading device, and an inner surface having ribs that protrude from the inner surface.

Some of the ribs function as sheet passage ribs extending in a sheet conveyance direction in which sheets are conveyed. A space serving as a sheet conveyance path is provided below the lower ends of the sheet passage ribs. When sheets are being conveyed, the sheets are guided through the space.

Some of the ribs other than the sheet passage ribs function as reinforcing ribs extending in a direction orthogonal to the sheet passage ribs. The reinforcing ribs enhance flexural rigidity of the sheet passage ribs and also enhance flexural rigidity and torsional rigidity of the cover member in collaboration with the sheet passage ribs.

SUMMARY

However, providing the above-described sheet passage ribs and reinforcing ribs does not readily give a sufficient rigidity to the cover member. And there has been room for improvement with regard to the texture and operability of the cover member.

Illustrative aspects of the disclosure provide a sheet conveying device and image reading device having a cover member with higher rigidity than conventional arrangements, and with excellent texture and operability.

According to an aspect of the disclosure, a sheet conveying device includes a conveying unit configured to convey sheets along a predetermined conveyance path, and a cover member disposed at a position covering the conveying unit and constituting one of exterior surfaces of the sheet conveying device. The cover member includes a first base portion constituting one of the exterior surfaces, a second base portion facing the first base portion across a space, and a plurality of linking portions provided between the first base portion and the second base portion and linking to both the first base portion and the second base portion. The first base portion, the second base portion, and the plurality of linking portions are integrally formed of a resin material into one piece. The second base potion includes a plurality of ribs protruding from a surface of the second base portion opposite to the first base portion.

With this structure, even if a force is applied in a direction to flex the first base portion, no large flexure will occur at the first base portion unless the second base portion is stretched or compressed.

According to another aspect of the disclosure, an image reading device includes a conveying unit configured to convey sheets along a predetermined conveyance path, a reading unit configured to read an image on a sheet conveyed by the conveying unit, and a cover member disposed at a position covering the conveying unit, and constituting one of exterior surfaces of the image reading device.

DESCRIPTION OF THE DRAWINGS

FIG. 6 is a cross-sectional view of the cover member taken along line VI-VI in FIG. 5A.

FIG. 7A is a cross-sectional view of the cover member taken along line VIIA-VIIA in FIG. 5B.

FIG. 7B is a cross-sectional view of the cover member taken along line VIIB-VIIB in FIG. 5A.

DETAILED DESCRIPTION

A sheet conveying device and an image reading device will be described next with reference to an exemplary embodiment.

Configuration of Multi-Function Apparatus

Figure 1:
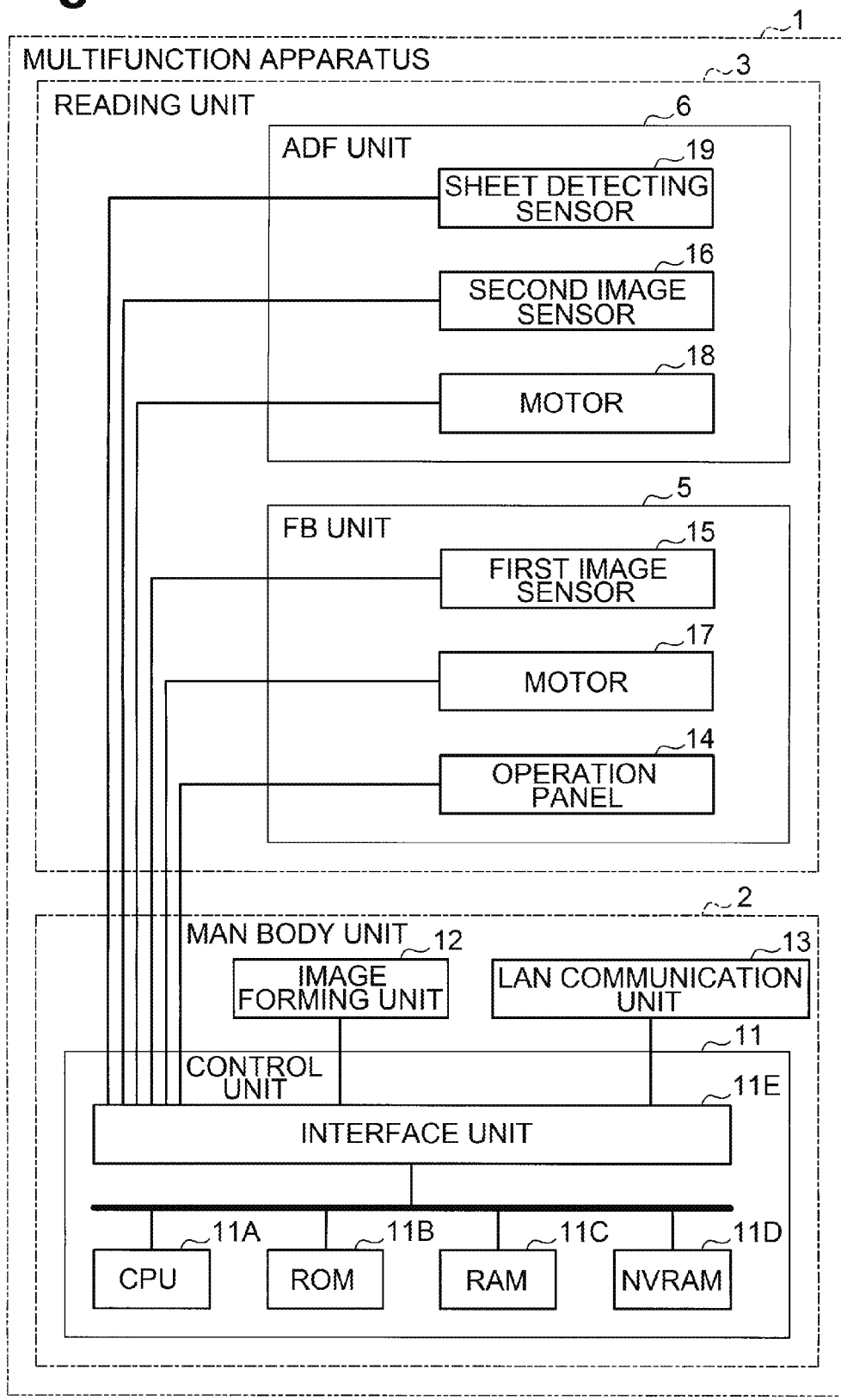
FIG. 1 is a block diagram illustrating the configuration of a multi-function apparatus.

A multi-function apparatus 1 illustrated in FIG. 1 has a configuration corresponding to an example of the sheet conveying device and image reading device. The multi-function apparatus 1 includes a main body unit 2, and a reading unit 3 (as an example of an image reading device), as illustrated in FIG. 1. The reading unit 3 includes a flatbed unit (hereinafter simply "FB unit") 5 and an automatic document feeder unit (hereinafter simply "ADF unit") 6 (as an example of a sheet conveying device). The reading unit 3 will be described in detail later.

The main body unit 2 includes a control unit 11, as illustrated in FIG. 1. The control unit 11 includes a known central processing unit (CPU) 11A, read-only memory (ROM) 11B, random access memory (RAM) 11C, non-volatile RAM (NVRAM) 11D, an interface unit 11E, and so forth. The CPU 11A executes predetermined processing following control programs stored in the ROM 11B and RAM 11C, and thereby executes control as to the various parts of the multi-function apparatus 1.

The control unit 11 controls an image-forming unit 12, a local area network (LAN) communication unit 13, an operation panel 14, a first image sensor 15, a second image sensor 16, a motor 17, a motor 18, a sheet detecting sensor 19, and so forth. The image-forming unit 12, the LAN communication unit 13, and the operation panel 14, are disposed in the main body unit 2. The first image sensor 15 and motor 17 are disposed in the FB unit 5. The second image sensor 16, motor 18, and sheet detecting sensor 19 are disposed in the ADF unit 6.

The image-forming unit 12 is configured to form images on a recording medium, using the ink-jet format. More specifically, the image-forming unit 12 includes a conveying mechanism for conveying recording media, a recording head for discharging ink, a driving mechanism for reciprocally moving the recording head, and so forth. Note, however, that these components are omitted from further description and illustration, as they are known configurations. Also note that the image-forming unit 12 may be configured to form images on a recording medium, using the electrophotography format.

The LAN communication unit 13 includes a communication interface device that handles wireless LAN and a communication interface device that handles wired LAN. The operation panel 14 has an input device (e.g., a touch panel, various types of buttons, and switches) which the user operates to give various types of instructions to the multi-function apparatus 1, and an output device (e.g., a liquid crystal display device and various types of lamps) to notify the user of the state of operation of the multi-function apparatus 1.

The first image sensor 15 and second image sensor 16 are both contact image sensors (CIS) in the embodiment. The motor 18 is a power source to operate the first image sensor 15. The motor 18 is a power source to convey sheets at the ADF unit 6. The sheet detecting sensor 19 is a sensor for detecting that the leading edge and trailing edge of the sheet in the sheet conveyance direction have passed through a predetermined detection position in the ADF unit 6.

A contact sensor, that switches on and off in accordance with whether or not in a state of contact with a sheet being conveyed, is used as the sheet detecting sensor 19 in this embodiment. It should be noted, however, that usage of a contact sensor is optional, and that a non-contact sensor for detecting that the leading edge and trailing edge of a sheet in the sheet conveyance direction has passed through a predetermined detection position may be used. For example, an optical sensor capable of detecting whether or not a sheet being conveyed is in a state of shielding an optical path, an optical sensor capable of detecting whether or not a sheet being conveyed is reflecting light, or the like, may be used.

Details of Reading Unit

Figure 2:
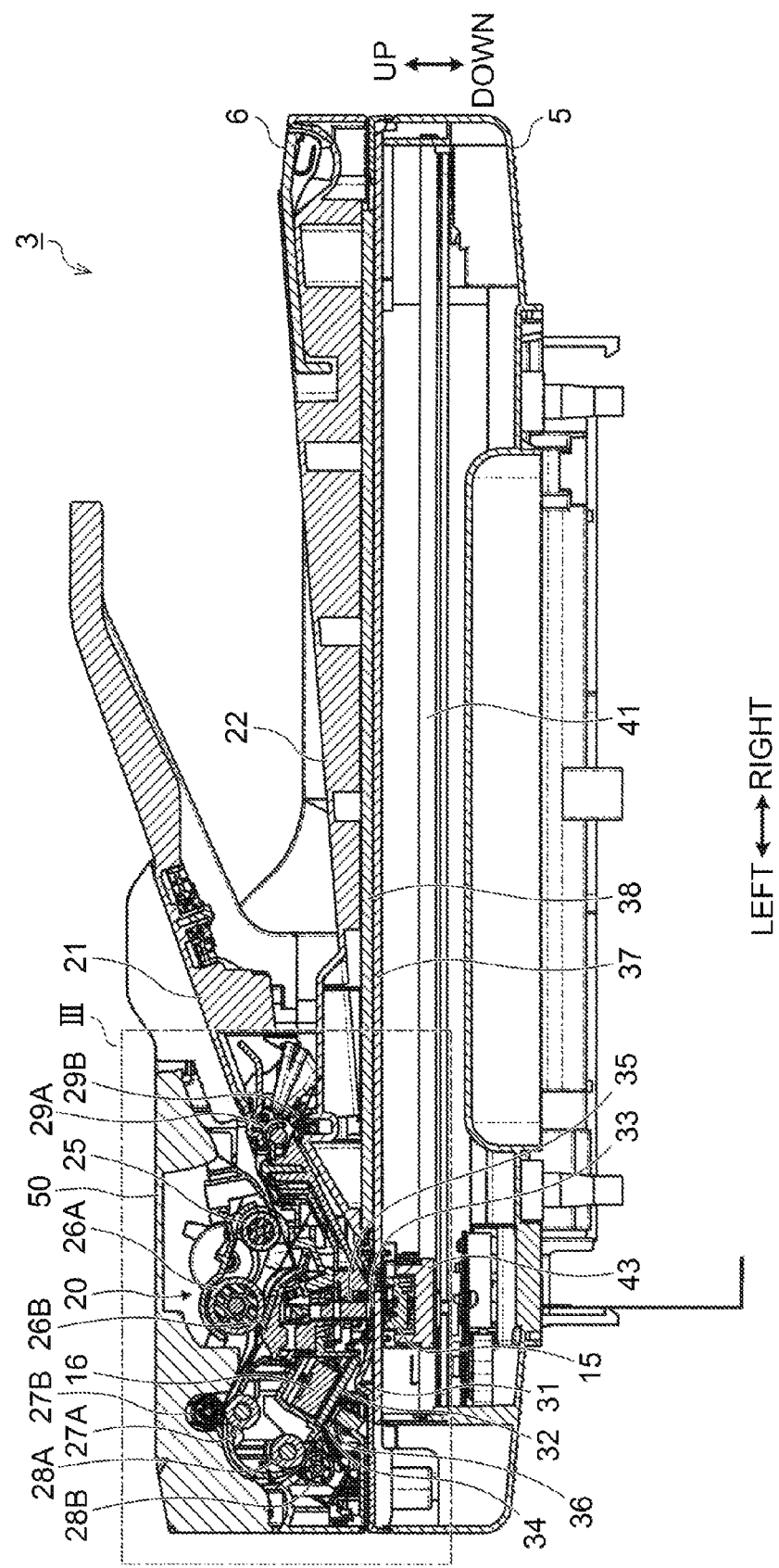
FIG. 2 is a longitudinal-section drawing of a reading unit.
Figure 3:
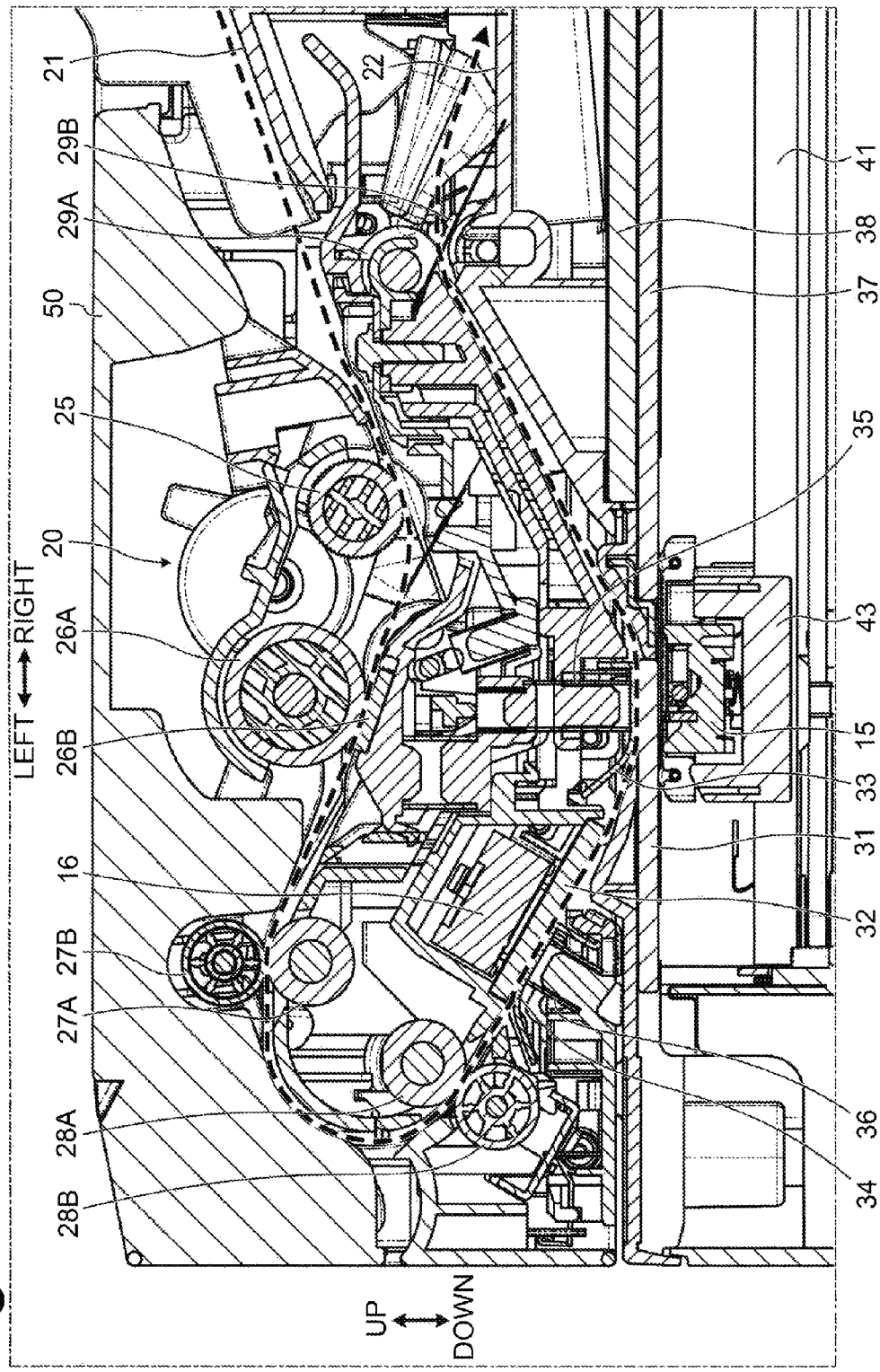
FIG. 3 is an enlarged illustration of portion III in FIG. 2.

The ADF unit 6 in the reading unit 3 includes a conveying unit 20 that conveys sheets along a predetermined conveyance path (indicated by a dotted line in FIG. 3), as illustrated in FIGS. 2 and 3. A supply unit 21 that supports sheets to be supplied to the conveying unit 20 is disposed upstream from the conveying unit 20 in the sheet conveyance direction. A discharge unit 22 that supports sheets discharged from the conveying unit 20 is disposed downstream from the conveying unit 20 in the sheet conveyance direction.

The conveying unit 20 includes an intake roller 25, a separation roller 26A, a separation pad 26B, a first conveying roller 27A, a first pinch roller 27B, a second conveying roller 28A, a second pinch roller 28B, a discharge roller 29A, a discharge pinch roller 29B, and so forth (of these, the separation roller 26A and separation pad 26B are an example of a separation unit).

Sheets loaded on the supply unit 21 are fed out downstream from the supply unit 21 in the sheet conveyance direction by the intake roller 25, and separated into individual sheets by the separation roller 26A and separation pad 26B. The sheets are further conveyed downstream in the sheet conveyance direction by the first conveying roller 27A and second conveying roller 28A, and are discharged onto the discharge unit 22 by the discharge roller 29A.

A first ADF platen 31 is provided at the lowest position of the conveyance path, and a first sheet pressing portion 33 is provided at a position facing the first ADF platen 31 across the conveyance path. The first sheet pressing portion 33 faces the first ADF platen 31 from above. A second ADF platen 32 is disposed above the conveyance path at a position where the conveyance path extends obliquely downward from the second conveying roller 28A toward the first ADF platen 31, and a second sheet pressing portion 34 is provided at a position facing the second ADF platen 32 across the conveyance path. The second sheet pressing portion 34 faces the second ADF platen 32 obliquely from below.

The first ADF platen 31 is disposed in the FB unit 5, and the second ADF platen 32, first sheet pressing portion 33, and second sheet pressing portion 34 are disposed in the ADF unit 6. The first ADF platen 31 and second ADF platen 32 are made from glass plates in this embodiment. The first sheet pressing portion 33 and second sheet pressing portion 34 are metal members (sheet metal parts).

The first sheet pressing portion 33 is urged toward the first ADF platen 31 by a spring 35, so as to press sheets, passing by, in contact with, the upper surface of the first ADF platen 31, toward the first ADF platen 31. Note that the first sheet pressing portion 33 includes protrusions, omitted from illustration, at both ends in the front-rear direction in this embodiment and on a side facing the first ADF platen 31. The protrusions come into contact with the first ADF platen 31. Accordingly, a minute gap is formed between the first ADF platen 31 and a surface of the first sheet pressing portion 33 that faces the first ADF platen 31, the gap corresponding to the height of the above protrusions.

When a sheet is conveyed between the first ADF platen 31 and the first sheet pressing portion 33, the first sheet pressing portion 33 presses the sheet toward the first ADF platen 31 to a degree where the aforementioned minute gap is maintained. The spring 35 presses the first sheet pressing portion 33 toward the first ADF platen 31 with an urging force of a degree such that conveyance of the sheet is not impeded, thereby keeping the sheet from floating up from the first ADF platen 31.

The second sheet pressing portion 34 is pressed toward the second ADF platen 32 by a spring 36, so as to press sheets, passing by in contact with the upper surface of the second ADF platen 32, toward the second ADF platen 32. Note that the second sheet pressing portion 34 also includes protrusions, omitted from illustration, at both ends in the front-rear direction in this embodiment and on the side facing the second ADF platen 32. These protrusions come into contact with the second ADF platen 32. Accordingly, a minute gap is formed between the second ADF platen 32 and the surface of the second sheet pressing portion 34 that faces the second ADF platen 32, the gap corresponding to the height of the above protrusions.

When a sheet is conveyed between the second ADF platen 32 and the second sheet pressing portion 34, the second sheet pressing portion 34 presses the sheet toward the second ADF platen 32 to a degree where the aforementioned minute gap is maintained. The spring 36 presses the second sheet pressing portion 34 toward the second ADF platen 32 with a biasing force of a degree such that conveyance of the sheet is not impeded, thereby keeping the sheet from moving up from the second ADF platen 32.

The FB unit 5 FB includes a platen 37, and the ADF unit 6 includes a pressuring unit 38. The FB platen 37 is made from a glass plate in this embodiment, as in the case of the first ADF platen 31 and the second ADF platen 32. The pressuring unit 38 is made from a layered member made up of a foamed resin layer and a hard resin film layer. When the ADF unit 6 is closed, the pressuring unit 38 comes into contact with the FB platen 37, while being slightly elastically deformed, thereby pressing an object to read that has been placed on the FB platen 37 against the FB platen 37.

The second ADF platen 32 and second sheet pressing portion 34 are inclined relative to the upper surface of the FB platen 37 that supports the object to read. Accordingly, a portion of the conveyance path defined between the second ADF platen 32 and the second sheet pressing portion 34 is inclined from the upper left toward the lower right in this embodiment. This means that the horizontal length of a region occupied by the portion of the conveyance path defined between the second ADF platen 32 and the second sheet pressing portion 34 is shorter as compared to a case where the portion of the conveyance path extends in the horizontal direction. Thus, the size of the structure around the region occupied by the portion of the conveyance path can be reduced in the horizontal direction, and the footprint of the multi-function apparatus 1 can be reduced correspondingly.

The FB unit 5 includes a guide rail 41, a carriage 43, and so forth. The guide rail 41 extends in the left-right direction, parallel to the lower surfaces of the first ADF platen 31 and the FB platen 37 below the first ADF platen 31 and the FB platen 37 in this embodiment.

The carriage 43 is attached to the upper side of the guide rail 41, and thus is supported in a state of being reciprocally movable in the left-right direction along the guide rail 41. The carriage 43 is linked to a toothed belt, omitted from illustration, and reciprocally moves in the left-right direction in accordance with the toothed belt being cyclically driven by force transmitted from the motor 17.

The first image sensor 15 is mounted on the carriage 43 and reciprocally moves in the left-right direction along with the carriage 43. The second image sensor 16 does not move from its position facing the conveyance path across the second ADF platen 32. The first image sensor 15 and second image sensor 16 have multiple reading elements which are arrayed in the front-rear direction in this embodiment.

In a case of reading an image of an object to read (e.g., a sheet or book original) placed on the upper surface of the FB platen 37, the first image sensor 15 reads the image while moving in an orthogonal direction (sub-scanning direction) to an array direction of reading elements (main scanning direction) along with the carriage 43. In a case of reading an image on a sheet conveyed by the conveying unit 20, the first image sensor 15 is stationary below the first sheet pressing portion 33 and first ADF platen 31, and reads the image of the sheet passing over, in contact with, the upper surface of the first ADF platen 31. The second image sensor 16 is disposed above the second sheet pressing portion 34 and second ADF platen 32, and reads the image of the sheet passing over, in contact with, the lower surface of the second ADF platen 32.

Details of Cover Member

Figure 4:
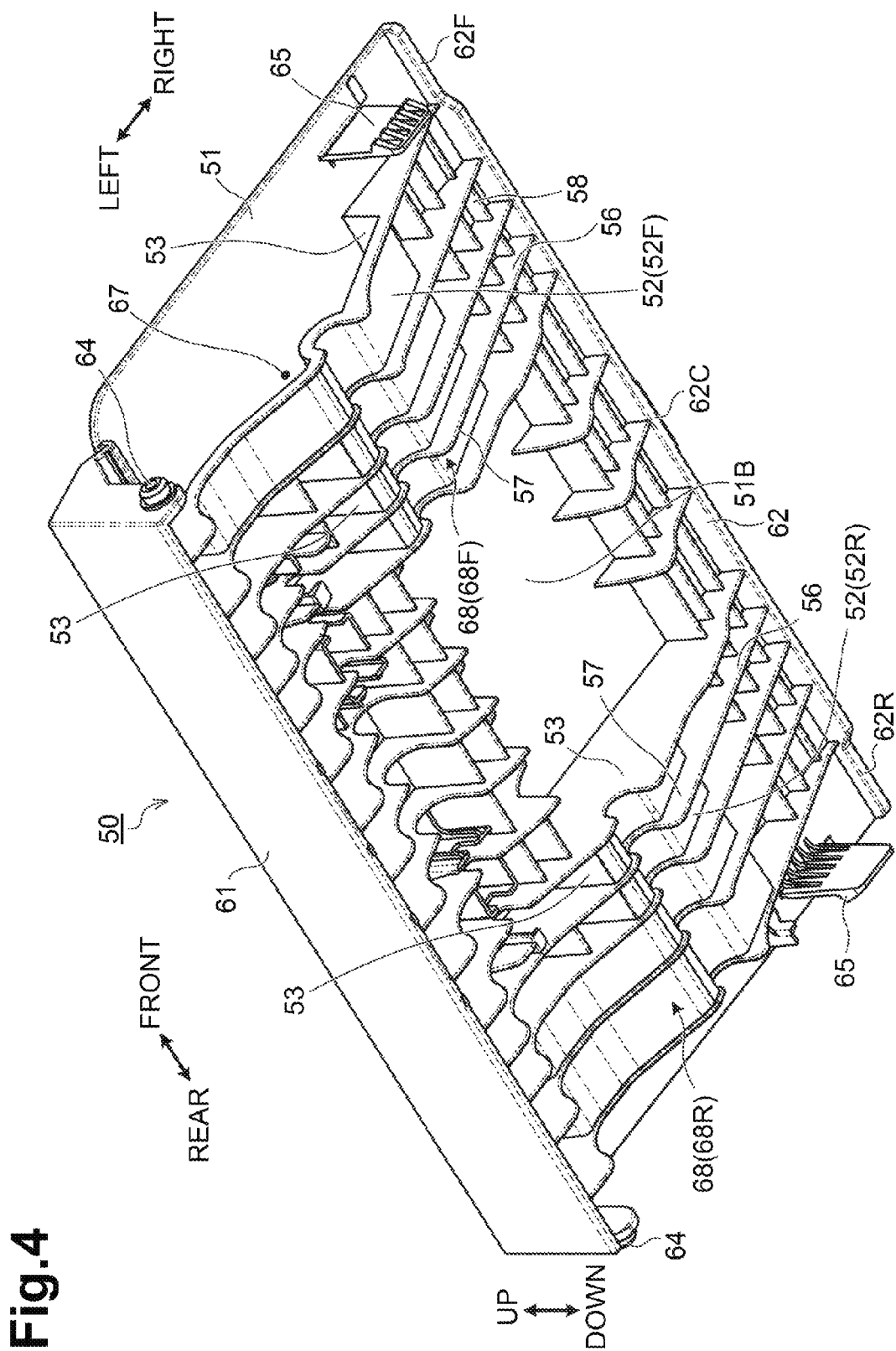
FIG. 4 is a perspective view of a cover member.
Figure 5A:
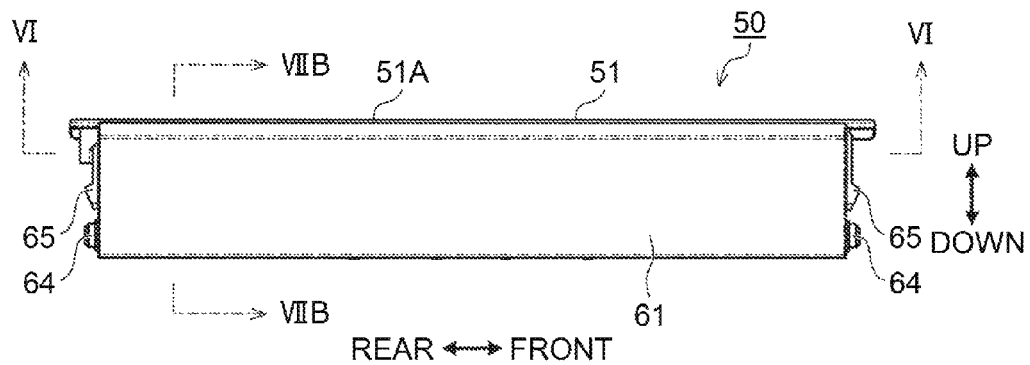
FIG. 5A is a left side view of the cover member.
Figure 5B:
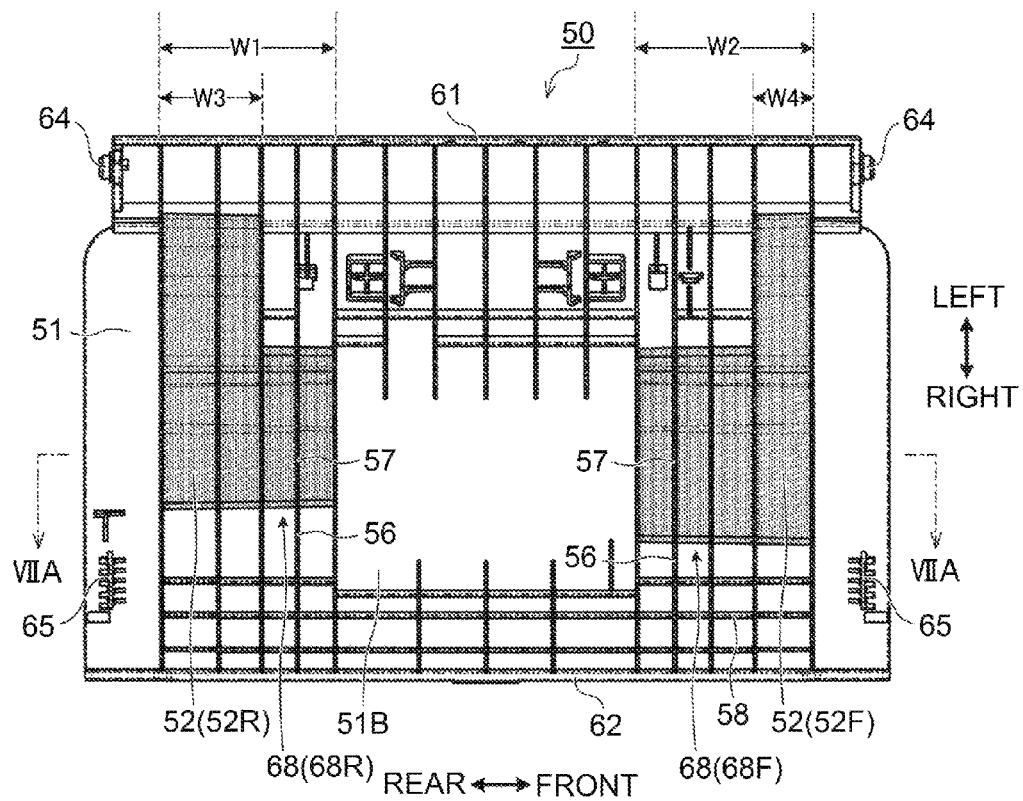
FIG. 5B is a bottom view of the cover member.
Figure 8A:
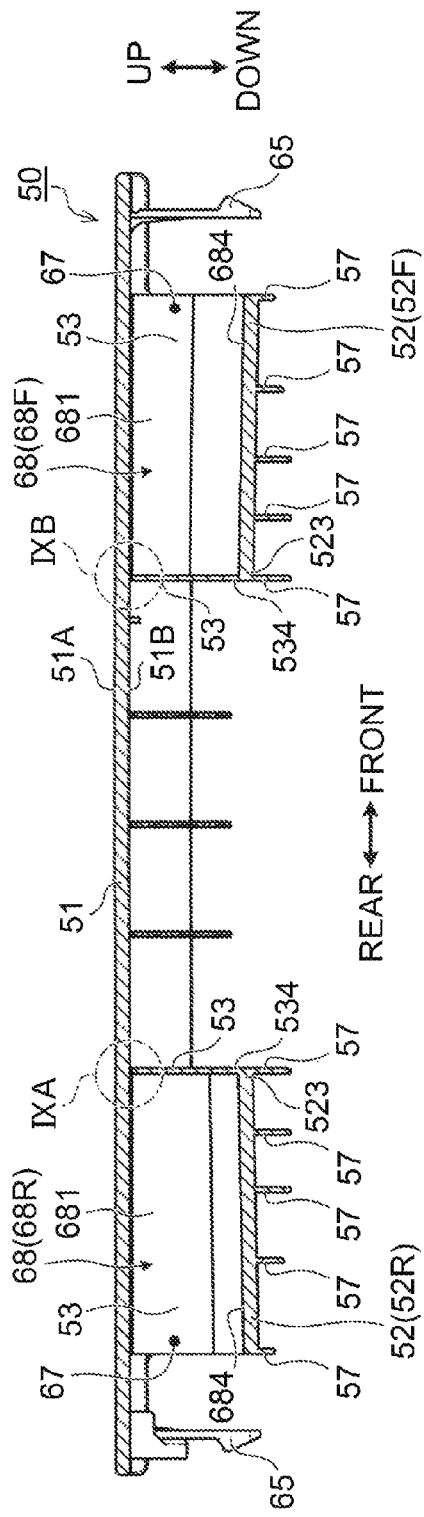
FIG. 8A is a cross-sectional view of a cover member that is different in details of shape from the cover member illustrated in FIG. 7A, taken along a cross-sectional line equivalent to that in FIG. 7A.
Figure 8B:
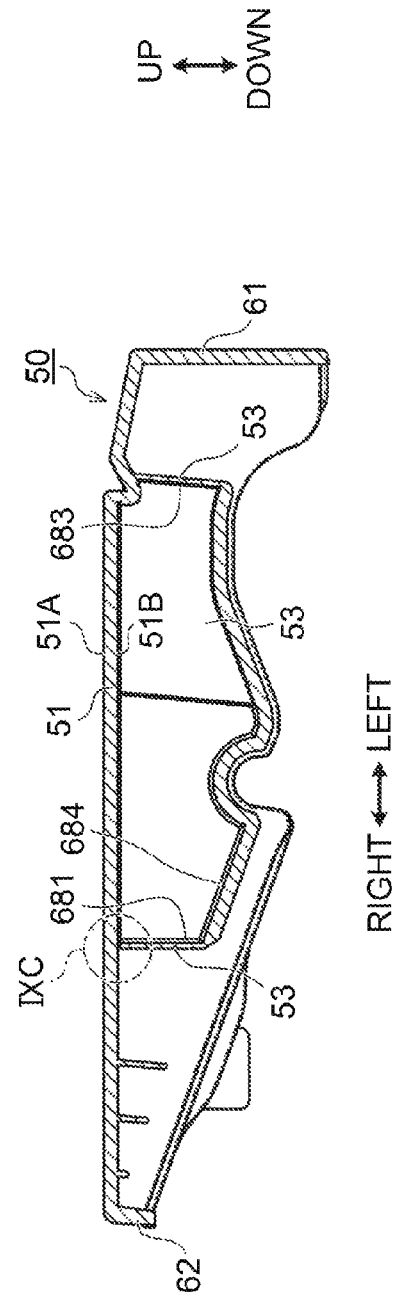
FIG. 8B is a cross-sectional view of a cover member that is different in details of shape from the cover member illustrated in FIG. 7B, taken along a cross-sectional line equivalent to that in FIG. 7B.

The ADF unit 6 includes a cover member 50 disposed at a position covering the conveying unit 20. The cover member 50 has a first base portion 51, second base portions 52, linking portions 53, first sheet passage ribs 56, second sheet passage ribs 57, reinforcing ribs 58, a first side wall 61, a second side wall 62, pivot portions 64, hook portions 65, and so forth, as illustrated in FIGS. 4, 5A, and 5B. The cover member 50 has a structure in which these members are integrally formed of a resin material, constitute a one-piece body and are inseparable from each other.

The ADF unit 6 supports the cover member 50 such that the cover member 50 is rotatable about the pivot portions 64, and is capable of moving between a closed position illustrated in FIGS. 2 and 3, and an opened position omitted from illustration. In the event of a jam (sheet obstruction) in the conveying unit 20, the cover member 50 can be moved to the opened position, and thus the sheet jammed in the conveyance path can be removed.

The first base portion 51 is formed as a flat plate having an outer surface 51A and an inner surface 51B. When the cover member 50 is in the closed position (see FIGS. 2 and 3), the thickness-wise dimension of the first base portion 51 is aligned with an up-down direction, and the outer surface 51A facing upwards in that state constitutes one of the exterior surfaces of the ADF unit 6.

The second base portions 52 are formed at positions facing the first base portion 51 across a space. The linking portions 53 that link to both of the first base portion 51 and the second base portions 52 are provided between the first base portion 51 and the second base portions 52.

The ranges where the second base portions 52 and linking portions 53 are disposed are indicated by shading in FIGS. 5B and 6. It can be seen from the shaded ranges that the second base portions 52 and linking portions 53 are formed at two locations that are separated in the front-rear direction in this embodiment. In the following description, the second base portion 52 disposed in a front portion may be referred to as a second base portion 52F, and the second base portion 52 disposed in a rear portion as a second base portion 52R.

The first sheet passage ribs 56 are ribs protruding from the first base portion 51. The second sheet passage ribs 57 are ribs protruding from the second base portions 52. The reinforcing ribs 58 are ribs protruding from the first base portion 51. More specifically, the first sheet passage ribs 56 and reinforcing ribs 58 are formed on the inner surface 51B of the first base portion 51. The second sheet passage ribs 57 are formed on the second base portions 52, on the side thereof opposite to the side that faces the first base portion 51.

The first sheet passage ribs 56 and the second sheet passage ribs 57 are formed such that each of the first sheet passage ribs 56 is continuous with a corresponding one of the second sheet passage ribs 57 as illustrated in FIG. 5B. The first sheet passage ribs 56 and the second sheet passage ribs 57 extend in the left-right direction in this embodiment in a state where the cover member 50 is in the closed position. The reinforcing ribs 58 are formed between adjacent first sheet passage ribs 56, and extend in the front-rear direction in this embodiment in a state where the cover member 50 is in the closed position.

The first sheet passage ribs 56, second sheet passage ribs 57, and reinforcing ribs 58 protrude downwards in this embodiment in a state where the cover member 50 is in the closed position. A space serving as a path for conveyance of sheets by the conveying unit 20 is defined immediately below the cover member 50, by the lower ends of the first sheet passage ribs 56 and second sheet passage ribs 57. That is to say, when sheets are conveyed by the conveying unit 20, the sheets come into contact with the lower ends of the first sheet passage ribs 56 and second sheet passage ribs 57, whereby further upward movement is restricted while being guided downstream in the sheet conveyance direction along the conveyance path.

The cover member 50 is disposed at a position covering the separation roller 26A. The aforementioned second base portions 52F and 52R are formed on respective sides of the cover member 50 across the separation roller 26A in a sheet width direction that is orthogonal to the sheet conveyance direction (formed in positions separated from each other in the front-rear direction in this embodiment, across the separation roller 26A). There is a range between the second base portion 52F and second base portion 52R where neither first sheet passage ribs 56 nor reinforcing ribs 58 are formed, as shown in FIG. 5B. This range is where the separation roller 26A is disposed.

In a case where the cover member 50 is in the closed position (see FIGS. 2 and 3), the outer surface of the first side wall 61 facing the left side in this embodiment constitutes one of the exterior surfaces of the ADF unit 6. In the state where the cover member 50 is in the closed position, the second side wall 62 protrudes downwards from the first base portion 51. The second side wall 62 is formed so as to be accessible to the fingertips of the user when performing opening/closing operations of the cover member 50.

The hook portions 65 engage engaging parts (omitted from illustration) of the ADF unit 6 when the cover member 50 is in the closed position, thereby preventing the cover member 50 from turning toward the opened position. Of four places in the four directions surrounding the space between the first base portion 51 and second base portions 52, the linking portions 53 are disposed at three places, and no linking portion 53 is provided at the remaining place. More specifically, with regard to the second base portion 52F that is at the front side in this embodiment, linking portions 53 are provided at the left side, the right side, and the rear side, while no linking portion 53 is provided at the remaining front side, as illustrated in the cross-sectional view in FIG. 6. On the other hand, with regard to the second base portion 52R that is at the rear side in this embodiment, linking portions 53 are provided at the left side, the right side, and the front side, while no linking portion 53 is provided at the remaining rear side, as illustrated in the cross-sectional view in FIG. 6.

Accordingly, the first base portion 51, each of the second base portions 52, and the linking portions 53 form a box-shaped portion 68 that has an opening 67 on one side, and the space between the first base portion 51 and each of the second base portions 52 is a space inside of the box-shaped portion 68. More specifically, the box-shaped portion 68 formed at the aforementioned second base portion 52F side (hereinafter also referred to as "box-shaped portion 68F") has the opening 67 toward the front. On the other hand, the box-shaped portion 68 formed at the aforementioned second base portion 52R side (hereinafter also referred to as "box-shaped portion 68R") has the opening 67 toward the rear.

Now, of the second base portions 52 and the linking portions 53, portions forming inner surfaces 681, 682, 683, and 684, of the box-shaped portion 68, are inclined, as illustrated in FIGS. 6, 7A and 7B such that the space inside of the box-shaped portion 68 becomes greater toward the opening 67. When forming the inside of the box-shaped portion 68 using mold parts such as sliding cores for example, this inclination allows the mold parts to be smoothly extracted from the opening 67.

The second sheet passage ribs 57 that protrude downwards in this embodiment from the second base portions 52 protrude farther downwards, the closer to the middle of the cover member 50 in the front-rear direction, as illustrated in FIG. 7A. In other words, the amount of downward protrusion of the second sheet passage ribs 57 is smaller the farther away from the middle of the cover member 50 toward the front end and rear end. Also, the amount of protrusion of the second side wall 62 from the first base portion 51 is smaller at a front end 62F and rear end 62R of the second side wall 62 as compared to a middle portion 62C thereof, as illustrated in FIG. 4.

Accordingly, when setting some sheets on the supply unit 21, the width-wise edges of the sheets are not readily snagged on the second sheet passage ribs 57 or second side wall 62 even if curling having a center of curvature parallel to the sheet conveyance direction (tubular curl) occurs and the width-wise sides of the sheets curl up higher than around the middle. Reducing the amount of protrusion of the second sheet passage ribs 57 and second side wall 62 at the width-wise edges of the sheets reduces the conveyance resistance acting upon the sheets which have curled such as described above, thus preventing empty feeding of sheets from occurring.

The first base portion 51 has first plate-shaped portions 511 corresponding to part of the first base portion 51, as illustrated in FIGS. 7A and 7B. The linking portions 53 have second plate-shaped portions 532 corresponding to part of the linking portions 53. In the state where the cover member 50 is in the closed position, the second plate-shaped portion 532 are portions extending downward in this embodiment from the first plate-shaped portions 511, and are the upper end portions of the linking portions 53. The second plate-shaped portion 532 are formed thinner (regarding dimensions in the front-rear direction in this embodiment in the state where the cover member 50 is in the closed position) than the first plate-shaped portion 511 (regarding dimensions in the vertical direction in this embodiment in the state where the cover member 50 is in the closed position). This prevents mold defects such as sink marks from being formed on the outer surface 51A at the first plate-shaped portion 511.

Each of the second base portions 52 has a shape partially curving toward the first base portion 51, as illustrated in FIG. 7B. Accordingly, each of the second base portions 52 has a gap to the first base portion 51 being smaller at one position (e.g., the position indicated by gap G1 in FIG. 7B) than at another position (e.g., the position indicated by gap G2 in FIG. 7B) (G1<G2). The flexural rigidity and torsional rigidity of the cover member 50 can thus be improved by employing a shape where the second base portions 52 are three-dimensionally curved, as compared to a case where the second base portions 52 are plate-shaped.

As can be seen from FIG. 5B, each of the second base portions 52 is also shaped such that it has a dimension in the sheet width direction orthogonal to the sheet conveyance direction larger at one portion (indicated with width W1 or W2 in FIG. 5B) than at another portion (indicated with width W3 or W4 in FIG. 5B). Accordingly, as compared to a case where the width-wise dimensions of the second base portions 52 are fixed, the shapes of the box-shaped portions 68F and 68R are three-dimensionally complex, and thus the flexural rigidity and torsional rigidity of the cover member 50 can be improved.

Now, the second base portions 52 have third plate-shaped portions 523 corresponding to part of the second base portions 52, as illustrated in FIGS. 7A and 7B. The linking portions 53 have the fourth plate-shaped portions 523 corresponding to part of the linking portions 53. In a state where the cover member 50 is at the closed position, the fourth plate-shaped portions 534 are portions extending upwards in this embodiment from the third plate-shaped portions 523, and are the lower end portions of the linking portions 53. In the example illustrated in FIGS. 7A and 7B, the thickness of the second plate-shaped portion 532 and the thickness of the fourth plate-shaped portion 534 are the same.

Note, however, that that the second plate-shaped portions 532 are preferably formed thinner at the first plate-shaped portions 511, from the perspective of preventing mold defects such as sink marks from being formed on the outer surface 51A. Accordingly, the second plate-shaped portions 532 may be formed thinner than the fourth plate-shaped portions 534 to this end, as illustrated in FIGS. 8A through 9C.

Figure 9A:
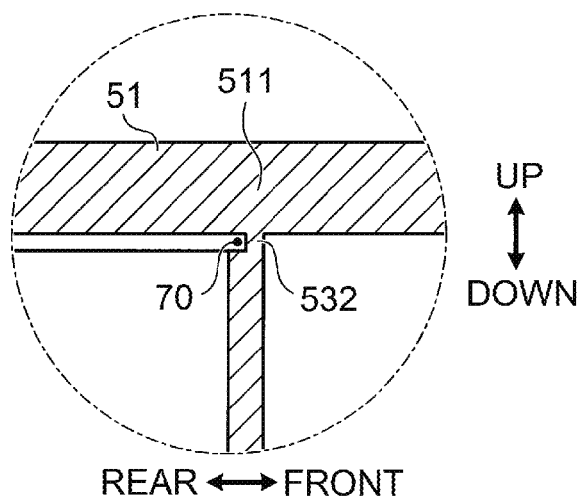
FIG. 9A is an enlarged illustration of portion IXA in FIG. 8A.
Figure 9B:
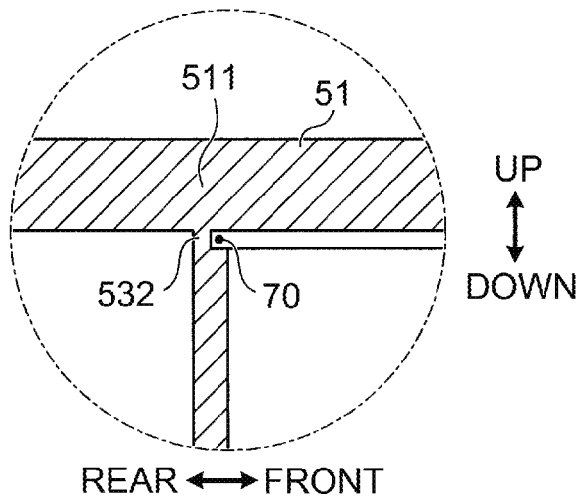
FIG. 9B is an enlarged illustration of portion IXB in FIG. 8A.

In the case of the linking portions 53 illustrated in FIGS. 9A and 9B, the greater part of each of the linking portions 53 is formed having the same thickness (dimension in the longitudinal direction in this embodiment) as a corresponding one of the fourth plate-shaped portions 534 which are the lower end portions of the linking portions 53. Note, however, that each of the second plate-shaped portions 532, which are the upper end portions of the linking portions 53, has a groove 70 recessed in the thickness direction of the linking portions 53 (toward the front in the case of FIG. 9A, and toward the rear in the case of FIG. 9B), so that each of the linking portions 53 is thinner by an amount corresponding to a corresponding one of the grooves 70.

Figure 9C:
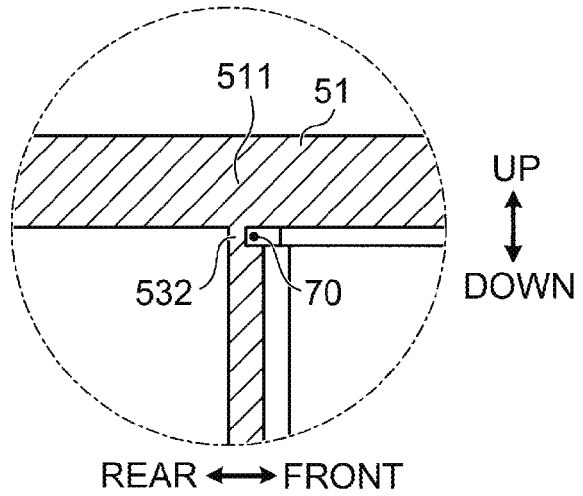
FIG. 9C is an enlarged illustration of portion IXC in FIG. 8B.

In the case of the linking portions 53 illustrated in FIG. 9C, the greater part of each of the linking portions 53 is formed having the same thickness (dimension in the left-right direction in this embodiment) as a corresponding one of the fourth plate-shaped portions 534 which are the lower end portions of the linking portions 53. Note, however, that each of the second plate-shaped portions 532, which are the upper end portions of the linking portions 53, has a groove 70 recessed in the thickness direction of the linking portion 53 (toward the right in the case of FIG. 9C), so that each of the linking portions 53 is thinner by an amount corresponding to the groove 70.

According to this structure, the effect of suppressing occurrence of sink marks in the first base portion 51 can be improved in comparison with a case where there is no difference in the thicknesses of the second plate-shaped portions 532 and the fourth plate-shaped portions 534.

Advantageous Effects

According to the multi-function apparatus 1 described above, the cover member 50 has the above-described structure where the first base portion 51, second base portions 52, and linking portions 53 are integrally formed using a resin material. Accordingly, even if a force is applied in a direction to flex the first base portion 51, no large flexure will occur at the first base portion 51 unless the second base portions 52 are stretched or compressed.

Thus, the rigidity of the entire cover member 50 can be enhanced as compared to a case where multiple ribs are erected in a juxtaposed manner on the first base portion 51 for reinforcement. That is to say, even if multiple ribs are erected in a juxtaposed manner on the first base portion 51, if a force is applied in a direction to flex the first base portion 51, the first base portion 51 can largely flex in a direction in which spacing between the ribs expand and contract. On the other hand, providing the second base portions 52 such as described above keeps spacing between the linking portions 53 from expanding and contracting, and thus the first base portion 51 does not readily flex, so the rigidity of the cover member 50 is improved.

In the case of the cover member 50 described above, the second sheet passage ribs 57 provided to the second base portions 52 improve the rigidity of the second base portions 52, which contributes to flexure suppression of the first base portion 51, and further improves the rigidity of the cover member 50.

Further, first sheet passage ribs 56 and reinforcing ribs 58 are formed on the inner surface 51B of the first base portion 51. Accordingly, flexure of the first base portion 51 is suppressed as compared with a case where such first sheet passage ribs 56 and reinforcing ribs 58 are not provided, thus further improving the rigidity of the cover member 50.

In the case of the cover member 50 described above, the second base portions 52 are formed on either side of the separation roller 26A, so the separation roller 26A and the second base portions 52 do not overlap in the vertical direction. This enables the cover member 50 to be disposed at a lower position, thereby reducing the thickness of the device.

The first sheet passage ribs 56 and second sheet passage ribs 57 of the cover member 50 described above serve to define a space to serve as the conveyance path for the conveying unit 20 to convey sheets, in addition to the function of improving the rigidity of the cover member 50. Accordingly, the number of parts can be reduced in comparison with an arrangement where members for defining a space to serve as the conveyance path for the conveying unit 20 to convey sheets are provided separately from the cover member 50, the number of steps of assembly can be reduced accordingly, and the weight of the device can be reduced.

The first base portion 51, second base portions 52, and linking portions 53 of the cover member 50 form box-shaped portions 68 with openings 67 at one side. Accordingly, the rigidity of the cover member 50 can be improved in comparison with an arrangement where such box-shaped portions 68 are not formed.

Other Embodiments

Although the sheet conveying device and image reading device have been described by way of exemplary embodiment, the above-described embodiment is only an exemplary illustration of one form of the disclosure. That is to say, the disclosure is not restricted to the above-described exemplary embodiment, and can be carried out in various forms without departing from the technical idea of the disclosure.

For example, the above embodiment illustrates that the reading unit 3 corresponding to the image reading device and the ADF unit 6 corresponding to the sheet conveying device are assembled into the multi-function apparatus 1, but the above configurations may be employed in an arrangement configured as a single-function image scanner device.

Supplement

It can be understood from the exemplary embodiment described above that the sheet conveying device and image reading device described in the present specification may further have the following configurations as well.

First, in the sheet conveying device and the image reading device described in the present specification, the first base portion may further include an outer surface that is one of the exterior surfaces, and an inner surface on the reverse side of the outer surface, the inner surface including ribs protruding from the inner surface.

According to the sheet conveying device configured in this way, ribs are formed on the inner surface of the first base portion as well, so flexure of the first base portion is suppressed as compared to an arrangement where such ribs are not provided, and the rigidity of the cover member can be further improved.

Also, in the sheet conveying device and the image reading device described in the present specification, the ribs formed on the first base portion and the ribs formed on the second base portion may be formed such that each of the ribs formed on the first base portion is continuous with a corresponding one of the ribs formed on the second base portion.

Also, in the sheet conveying device and the image reading device described in the present specification, of four places in four directions surrounding a space between the first base portion and second base portions, the linking portions may be disposed at three places, with no linking portion provided at the remaining place.

According to the sheet conveying device configured in this way, linking portions are provided at the above three places and no linking portion is provided at the remaining place. Accordingly, when forming the first base portion, second base portions, and linking portions in one piece of the resin material, mold parts can be extracted from the space between the first base portion and the second base portions using the above one place, thereby obtaining a cover member molded in the desired shape.

Also, in the sheet conveying device and the image reading device described in the present specification, the conveying unit further may include a separation unit configured to separate sheets into individual sheets and to feed the sheets toward a downstream side in a sheet conveyance direction. The cover member may be disposed at a position covering the separation unit, and the second base portions may be formed across the separation unit, on both sides in the sheet width direction that is orthogonal to the sheet conveyance direction.

According to the sheet conveying device configured in this way, the second base portions are formed at both sides across the separation unit, so the separation unit and the second base portions do not overlap in the vertical direction. This enables the cover member to be disposed at a lower position, thereby reducing the thickness of the device.

Also, in the sheet conveying device and the image reading device described in the present specification, the first base portion further may include first plate-shaped portions, and the linking portions may include second plate-shaped portions extending from the first plate-shaped portions. The second plate-shaped portions may be formed thinner than the first plate-shaped portions.

According to the sheet conveying device configured in this way, the second plate-shaped portions are formed thinner than the first plate-shaped portions. This enables mold defects such as sink marks to be prevented from being formed at the first base portion, as compared to a case where the second plate-shaped portions are formed thicker than the first plate-shaped portions.

Also, in the sheet conveying device and the image reading device described in the present specification, the second base portions may include third plate-shaped portions, and the linking portions may further include fourth plate-shaped portions extending from the third plate-shaped portions. The second plate-shaped portions may be formed thinner than the fourth plate-shaped portions.

According to the sheet conveying device configured in this way, the second plate-shaped portions are formed thinner than the fourth plate-shaped portions. This enables mold defects such as sink marks to be prevented from being formed at the first base portion, as compared to a case where the second plate-shaped portions and the fourth plate-shaped portions are formed with no difference in thickness.

Also, in the sheet conveying device and the image reading device described in the present specification, the ribs define a space serving as a conveyance path for the conveying unit to convey sheets.

According to the sheet conveying device configured in this way, the ribs serve to define a space to serve as the conveyance path for the conveying unit to convey sheets, in addition to the function of improving the rigidity of the cover member. Accordingly, the number of parts can be reduced in comparison with an arrangement where members for defining a space to serve as the conveyance path for the conveying unit to convey sheets are provided separately from the cover member, the number of steps of assembly can be reduced accordingly, and the weight of the device can be reduced.

Also, in the sheet conveying device and the image reading device described in the present specification, the second base portions may have a shape partially curving toward the first base portion, whereby the second base portions may have a gap to the first base portion being smaller at one position than at another position.

According to the sheet conveying device configured in this way, the second base portions have a shape partially curving toward the first base portion, so the second base portions have a gap to the first base portion being smaller at one position than at another position. Accordingly, the rigidity of the cover member can be improved as compared to an arrangement where the second base portions are plate-shaped.

Also, in the sheet conveying device and the image reading device described in the present specification, the second base portions may be shaped such that each of the second base portions has a dimension in the sheet width direction orthogonal to the sheet conveyance direction larger at one portion than another portion.

Also, in the sheet conveying device and the image reading device described in the present specification, the first base portion, second base portions, and linking portions may form a box-shaped portion that has an opening on one side, and the space between the first base portion and second base portions may be a space inside of the box-shaped portion.

According to the sheet conveying device configured in this way, the first base portion, second base portions, and linking portions form a box-shaped portion that has an opening on one side. Accordingly, the rigidity of the cover member can be improved as compared to an arrangement where such a box shape is not formed.

Also, in the sheet conveying device and the image reading device described in the present specification, of the second base portions and linking portions, the portions forming inner surfaces of the box-shaped portion, may be inclined such that the space inside of the box-shaped portion becomes greater toward the opening.

According to the sheet conveying device configured in this way, the above incline is given to the portions forming inner surfaces of the box-shaped portion. Accordingly, when forming the box-shaped portion into one piece of the resin material, mold parts can be easily extracted from the inside of the box-shaped portion, thereby obtaining a cover member molded having a portion formed in a box shape.

What is claimed is:
1. A sheet conveying device comprising:
a conveying unit configured to convey sheets along a predetermined conveyance path; and a cover member disposed at a position covering the conveying unit, and constituting one of exterior surfaces of the sheet conveying device, the cover member including:
- a first base portion constituting one of the exterior surfaces;
- a second base portion facing the first base portion across a space; and
- a plurality of linking portions provided between the first base portion and the second base portion and linking to both the first base portion and the second base portion, the first base portion, the second base portion, and the plurality of linking portions being integrally formed of a resin material into one piece, wherein the second base portion includes a plurality of ribs protruding from a surface of the second base portion opposite to the first base portion, and wherein the first base portion, the second base portion, and the linking portions form a box-shaped portion that has an opening on one side, the space between the first base portion and second base portion being a space inside of the box-shaped portion.

2. The sheet conveying device according to claim 1, wherein the first base portion further includes:
- an outer surface that is one of the exterior surfaces of the sheet conveying device,
- an inner surface opposite to the outer surface, and
- a plurality of ribs protruding from the inner surface.

3. The sheet conveying device according to claim 2, wherein each of the plurality of ribs formed on the first base portion is continuous with a corresponding one of the plurality of ribs formed on the second base portion.

4. The sheet conveying device according to claim 1, wherein the linking portions surrounds the second base portion on three of four sides, and no linking portion is provided on one of the four sides.

5. The sheet conveying device according to claim 1, wherein the conveying unit further includes a separation unit configured to separate sheets into individual sheets and to sequentially feed the individual sheets toward a downstream side in a sheet conveyance direction in which the sheets are conveyed, wherein the cover member is disposed at a position covering the separation unit, and wherein the second base portion is formed on each side of the separation unit in a sheet width direction that is orthogonal to the sheet conveyance direction.

6. The sheet conveying device according to claim 1, wherein the first base portion further includes a first plate-shaped portion, wherein each of the linking portions further includes a second plate-shaped portion extending from the first plate-shaped portion, and wherein the second plate-shaped portion is formed thinner than the first plate-shaped portion.

7. The sheet conveying device according to claim 6, wherein the second base portion further includes a third plate-shaped portion, wherein each of the linking portions further includes a fourth plate-shaped portion extending from the third plate-shaped portion, and wherein the second plate-shaped portion is formed thinner than the fourth plate-shaped portion.

8. The sheet conveying device according to claim 1, wherein the plurality of ribs formed on the second base portion define a space serving as a conveyance path for the conveying unit to convey sheets.

9. The sheet conveying device according to claim 1, wherein the second base portion has a shape partially curving toward the first base portion such that the second base portion has a gap to the first base portion being smaller at one position than at another position.

10. The sheet conveying device according to claim 1, wherein the second base portion is shaped such that the second base portion has a dimension in a sheet width direction larger at one portion that at another portion, the sheet width direction being orthogonal to a sheet conveyance direction in which the sheets are conveyed.

11. The sheet conveying device according to claim 1, wherein, of the second base portion and the linking portions, portions forming inner surfaces of the box-shaped portion are inclined such that the space inside of the box-shaped portion becomes greater toward the opening.

12. An image reading device comprising:
- a conveying unit configured to convey a sheet along a predetermined conveyance path the conveying unit including a separation unit configured to separate sheets into individual sheets and to sequentially feed the individual sheets downstream in a sheet conveyance direction in which the sheets are conveyed;
- a reading unit configured to read an image on the sheet conveyed by the conveying unit; and
- a cover member disposed at a position covering the separation unit of the conveying unit, and constituting one of exterior surfaces of the image reading device, the cover member including
  - a first base portion constituting one of the exterior surfaces,
  - a second base portion facing the first base portion across a space, the second base portion being formed on each side of the separation unit in a sheet width direction that is orthogonal to the sheet conveyance direction and
  - a plurality of linking portions provided between the first base portion and the second base portion and linking to both the first base portion and the second base portion, the first base portion, the second base portion, and the plurality of linking portions being integrally formed of a resin material into one piece, wherein the second base portion includes a plurality of ribs protruding from a surface of the second base portion opposite to the first base portion.

13. A sheet conveying device comprising:
- a conveying unit configured to convey sheets along a predetermined conveyance path in a sheet conveying direction; and
- a cover member disposed at a position covering the conveying unit, and constituting one of exterior surfaces of the sheet conveying device, the cover member including:
  - a first base portion constituting one of the exterior surfaces;
  - a second base portion overlapping the first base portion in a facing direction, the facing direction being orthogonal to an exterior surface of the cover member, the first base portion being spaced from the second base portion in the facing direction; and
  - a plurality of linking portions provided between the first base portion and the second base portion in one of the sheet conveying direction and a width direction perpendicular to the sheet conveying direction and the facing direction, the plurality of linking portions linking to both the first base portion and the second base portion, the first base portion, the second base portion, and the plurality of linking portions being integrally formed of a resin material into one piece, wherein the second base portion includes a plurality of ribs protruding from a surface of the second base portion opposite to the first base portion such the plurality of ribs and the first base portion at least partially sandwich the second base portion in the facing direction.

* * * * *